June 2, 1931. W. N. BOOTH 1,807,824
MACHINE FOR SIZING AND PUNCHING VEHICLE WHEEL RIMS
Filed Sept. 16, 1925   3 Sheets-Sheet 2

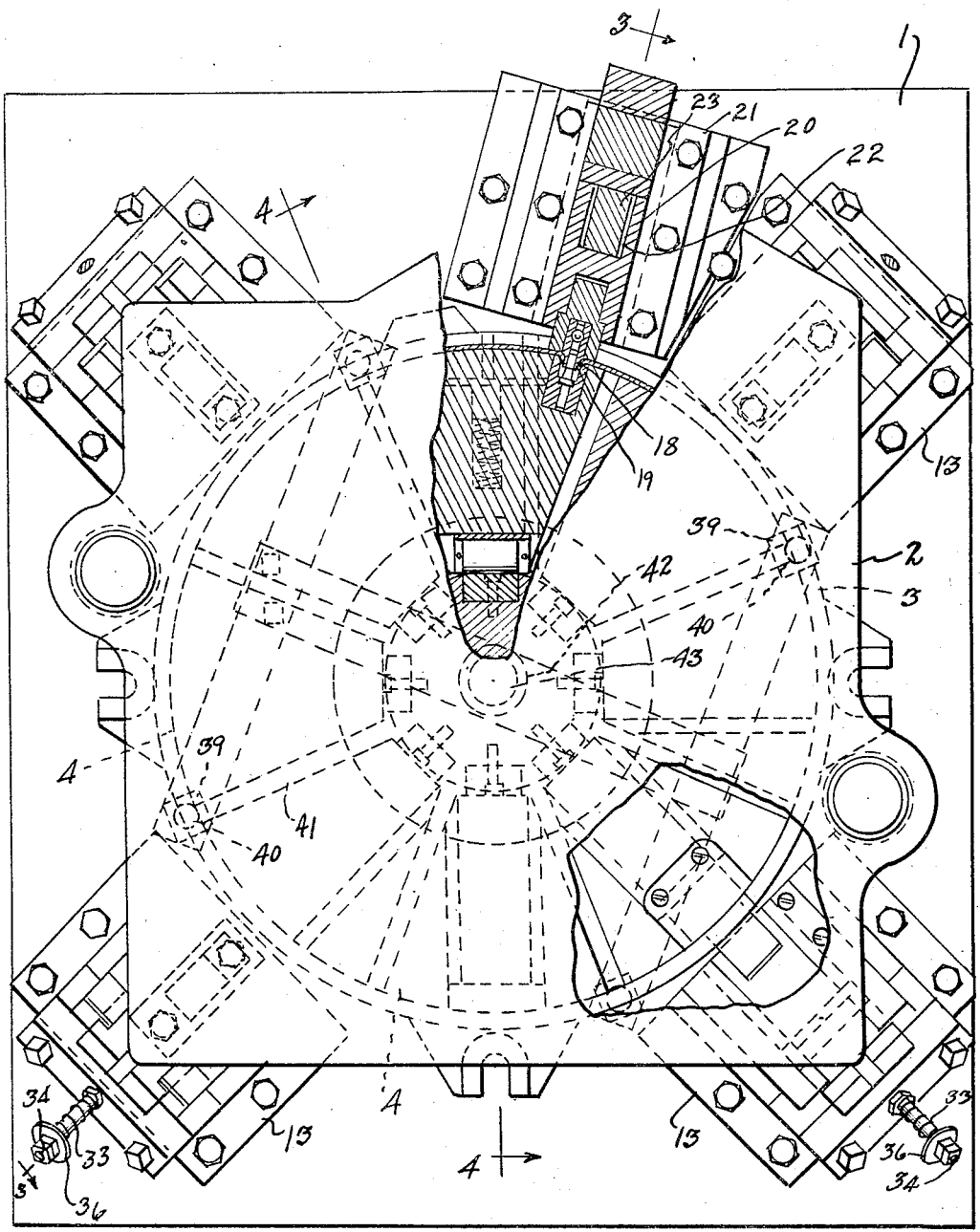

INVENTOR.
WILLIAM N. BOOTH
BY
ATTORNEYS

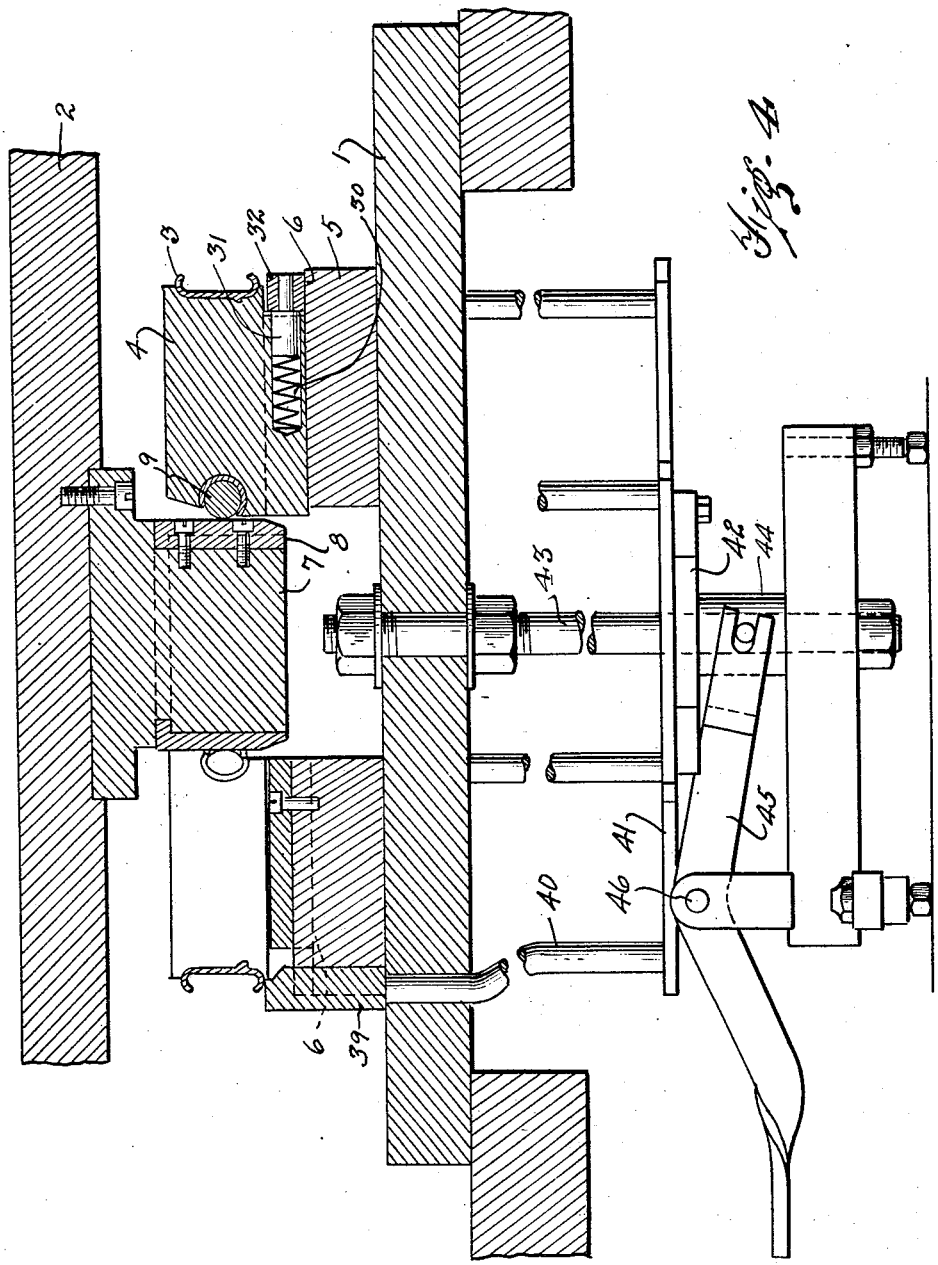

Patented June 2, 1931

1,807,824

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

MACHINE FOR SIZING AND PUNCHING VEHICLE WHEEL RIMS

Application filed September 16, 1925. Serial No. 56,747.

The invention relates to machines for sizing vehicle wheel rims and has for one of its objects an improved construction for sizing a rim and subsequently ejecting the same. Another object is the provision of means for successively sizing a rim and punching the same to form apertures in the rim at an angle to its plane of rotation. A further object is the provision of a common means for successively sizing and punching a rim. With these as well as other objects in view the invention resides in the novel features of construction and combinations and arrangements of parts as more fully hereinafter set forth.

In the drawings:—

Figure 1 is a plan view, partly in section, of a rim sizing and punching machine embodying my invention;

Figure 3:
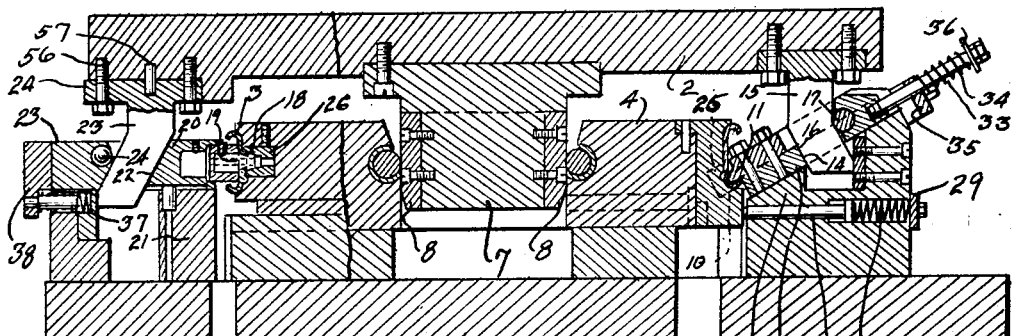
Figure 2:
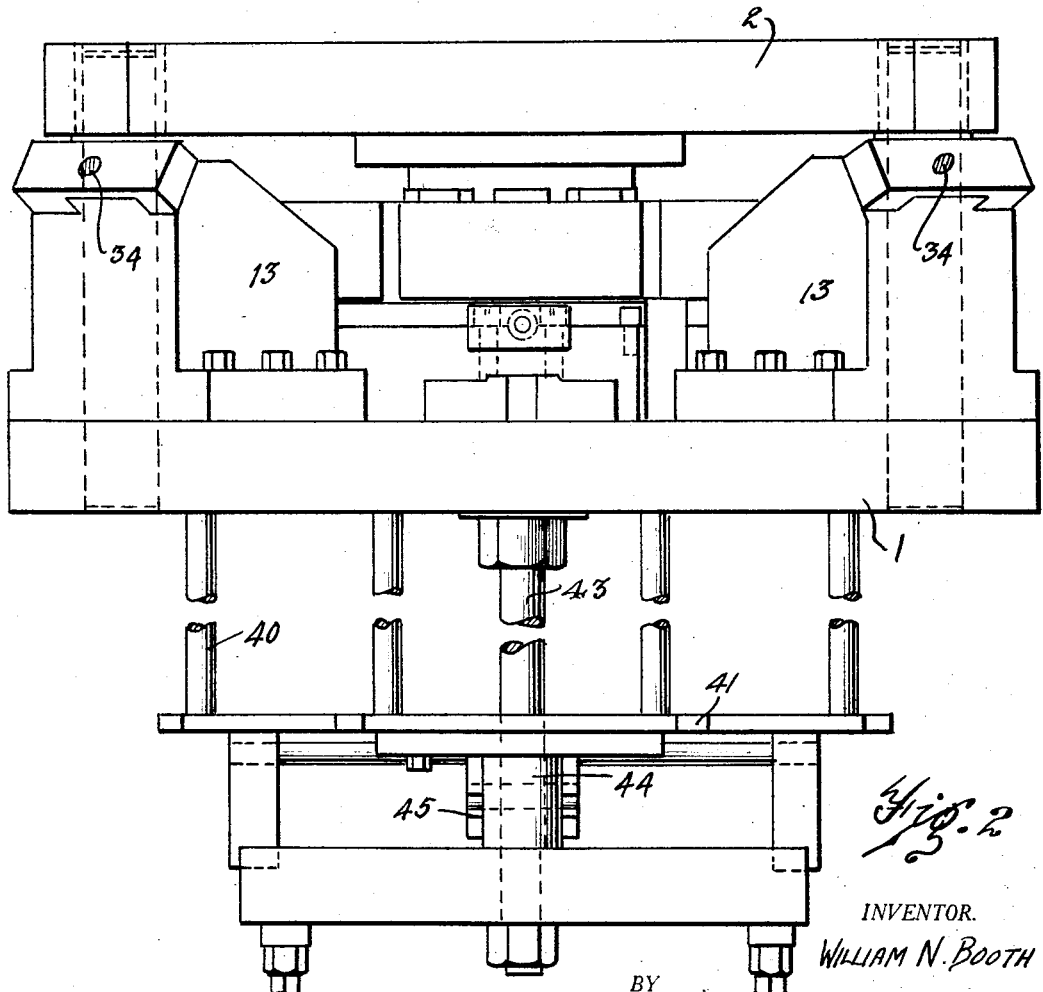
Figure 2 is a side elevation thereof.

Figures 3 and 4 are cross sections on the lines 3—3 and 4—4, respectively, of Figure 1.

In general the machine may be used to size and punch vehicle wheel rims such as demountable rims and permanent rims or fellies. In the present instance I have shown a machine designed to operate upon a demountable rim. This machine is in the nature of a press having the bolster 1 and the vertically reciprocable holder member 2 which is adapted to be secured to the ram of the press.

For sizing the demountable rim 3 I have provided the series of radially outwardly movable blocks 4 which are engageable with the rim to expand or stretch the same to size. These blocks are mounted upon the support 5 which is secured upon the bolster and is provided with radially extending guideways 6 engageable by correspondingly shaped portions upon the blocks. 7 is a central projection depending from the holder member 2 and preferably provided with the wear blocks 8 on its sides which have cam surfaces engageable with the rollers 9 secured in the inner ends of the blocks to move the latter radially outwardly.

For forming the apertures 10 in the rim for engagement with the rivet portions of lugs which are to be permanently secured to the rim I have provided the punches 11 which are movable inwardly toward the rim at an angle to the path of movement of the blocks 4. These punches are carried by the holders 12 which are mounted upon and guided by the supporting blocks 13 secured to the bolster 1 at its corners. The holders 12 are provided with the openings 14 which are engageable in by the projections 15 depending from the holder member 2. The lower portions of these projections are inclined downwardly and outwardly relative to the rim to form the cam faces 16 which are engageable with the inner walls of the openings 14 to force the punches inwardly into engagement with the rim when the holder member 2 is moved vertically downward. 17 are rollers mounted in the punch holders 12 adjacent to the outer walls of the openings 14 and engageable with the lower portions of the projections 15 when the latter are moved upwardly with the holder member 2 to initially withdraw the punches from the rim.

To form the aperture 18 in the demountable rim 3 for the passage of the valve stem of the pneumatic tire, I have provided the punch 19 which is secured to the holder 20. This punch and holder are radially movable and the holder is supported upon and guided by the block 21 which is supported upon the bolster 1. The holder 20 is provided with the opening 22 which is engageable by the cam projection 23 which depends from the holder member 2 and operates in the same manner as the cam projections 15. A roller 24 is also provided in the holder 20 for engagement with the cam projection when the latter is being raised to initially disengage the punch 19 from the rim.

The blocks 4 opposite to the punches carry suitable dies 25 and 26, respectively, for cooperating with the punches 11 and 19.

For disengaging the blocks 4 from the rim I have provided in the blocks 13 the coil springs 27 which are adapted to force the plungers 28 radially inward into contact with the blocks 4 in radial alignment therewith and thereby move these blocks radially inward. These plungers 28 are guided by the blocks 13 and the coil springs are held in place by suitable means such as the plates 29 which are secured to the blocks 13. The remaining blocks 4 are forced radially inward by means of the coil springs 30 which are located in these blocks and have their inner ends abutting the same and their outer ends abutting the plugs 31 which are also located in these blocks and are held from radial outward movement by means of the anchor blocks 32 which are secured upon the support 5. The punch holders 12 are also returned to their normal positions by spring means which comprises the coil springs 33 surrounding the rods 34 which are threaded into the punch holders 12 and extend through the brackets 35. These brackets are mounted upon the blocks 13 and form abutments for the inner ends of the coil springs, the outer ends of these coil springs abutting the washers 36 secured upon the outer ends of the rods 34. The punch holder 20 is also moved radially outward to its normal position by means of a spring which as shown is the coil spring 37 mounted in the block 21 and having its inner end abutting the same and its outer end abutting the bar 38 which is secured to the outer end of the punch holder 20.

For ejecting the demountable rim after it has been sized and punched I have provided suitable manually operable ejector mechanism which includes the ejector members 39 which are located above the bolster 1 and normally below the demountable rim but are adapted to be raised to engage this demountable rim and move the same upwardly above the blocks 4. These ejector members are secured to the upper end of the rods 40. In the present instance there are four ejector members and also four rods and pairs of these rods are mounted upon the cross bars 41 which in turn are mounted upon the support 42. This support is vertically reciprocable and guided by the guide rod 43 secured to and depending from the bolster 1. 44 is a bushing below the support and also guided by the guide rod 43, this bushing being adapted to be raised and lowered by means of the lever 45 which is pivoted upon the stationary pivot 46 and has a portion projecting outwardly for engagement with the foot of the operator.

What I claim as my invention is:

1. In a machine for sizing and punching vehicle wheel rims, the combination with radially movable blocks engageable with a rim to size the same, of punches movable toward the rim in planes diagonal to the path of movement of said blocks for forming apertures in the rim and means for successively operating said blocks and punches.

2. In a machine for sizing vehicle wheel rims, the combination with means for sizing a rim, including radially movable engageable with the rim, of means for moving said blocks into engagement with the rim, spring means for moving said blocks out of engagement with the rim and manually operable means for ejecting the rim, including ejector members movable transversely of the path of movement of said blocks and engageable with the rim at angularly spaced points.

3. In a machine for sizing and punching vehicle wheel rims, the combination with a bolster, of radially outwardly movable blocks engageable with the rim to size the same, a support upon said bolster for said blocks provided with means for guiding the latter, punches movable toward the rim in planes diagonal to the path of movement of said blocks for forming apertures in the rim, means upon said bolster for supporting and guiding said punches and a reciprocable member for successively actuating said blocks and punches into engagement with the rim.

4. In a machine for sizing and punching vehicle wheel rims, the combination with radially outwardly movable blocks engageable with a rim to size the same, of punches movable in planes inclined to the plane of movement of said blocks for forming apertures in the rim, a punch movable parallel to the path of movement of one of said blocks for forming an aperture in the rim, and a common means for actuating said blocks and all of said punches into engagement with the rim.

5. In a machine for sizing and punching vehicle wheel rims, the combination with radially movable blocks engageable with the rim to size the same, of means movable subsequently to the sizing blocks for forming apertures in the rim, and means for ejecting the rim, including ejector members movable transversely of the path of movement of said blocks and engageable with the rim.

6. In a machine for sizing and punching vehicle wheel rims, the combination with radially movable blocks engageable with a rim to size the same, of means movable toward the rim for forming apertures in the rim, means for ejecting the rim including ejector members movable transversely of the path of movement of said blocks and engageable with the rim, a support for said ejector members, and means for moving said support transversely of the path of movement of said blocks.

7. In a machine for sizing and punching vehicle wheel rims, the combination with radially movable blocks engageable with a rim to size the same, of punches movable toward the rim for forming apertures in the rim, a member movable transversely of the path of movement of the said blocks, means upon said member for moving said blocks and punches toward the rim, spring means for moving said blocks and punches away from the rim and means for ejecting the rim including a plurality of ejector members engageable with the rim at angularly spaced points.

In testimony whereof I affix my signature.

WILLIAM N. BOOTH.